United States Patent
Bondarenko et al.

(10) Patent No.: US 6,213,472 B1
(45) Date of Patent: Apr. 10, 2001

(54) SHAFT SEAL

(75) Inventors: German Andreyevich Bondarenko; Nicolay Dmitriyevich Fedorenko; Sergey Anatolyevich Pavlyuk; Alexander Vladimirovich Deineka; Sergey Alexeyevich Kolesnik, all of Sumy (UA)

(73) Assignee: Dresser-Rand Company, Corning, NY (US)

( * ) Notice: Subject to any disclaimer, the term of this patent is extended or adjusted under 35 U.S.C. 154(b) by 0 days.

(21) Appl. No.: 08/836,689

(22) PCT Filed: Nov. 16, 1994

(86) PCT No.: PCT/IB94/00379

§ 371 Date: Dec. 8, 1997

§ 102(e) Date: Dec. 8, 1997

(87) PCT Pub. No.: WO96/15397

PCT Pub. Date: May 23, 1996

(Under 37 CFR 1.47)

(51) Int. Cl.$^7$ .................................................. F16J 15/34
(52) U.S. Cl. ............................................ 277/399; 277/400
(58) Field of Search .................................... 277/399, 400

(56) References Cited

U.S. PATENT DOCUMENTS

| 4,212,475 | 7/1980 | Sedy . | |
|---|---|---|---|
| 5,071,141 | * 12/1991 | Lai et al. | 277/399 |

FOREIGN PATENT DOCUMENTS

| 93203272 | 1/1992 | (EP) . |
| 93302253 | 3/1993 | (EP) . |
| 9430618 | 5/1994 | (EP) . |

OTHER PUBLICATIONS

Josef Sedy, *Improved Performance of Film–Riding Gas Seals Through Enhancement of Hydrodynamic Effects*, vol. 23, 1.35–44.

Ralph P. Gabriel, *Fundamentals of Spiral Groove Noncontacting Face Seals*, vol. 35, 7. 367–375.

* cited by examiner

*Primary Examiner*—Anthony Knight
*Assistant Examiner*—Enoch E. Peavey
(74) *Attorney, Agent, or Firm*—Haynes and Boone, LLP

(57) ABSTRACT

The invention relates to a non-contacting shaft seal formed between a rotating sealing ring (3) and a non-rotating circular sealing element (1). The sealing element (1) is spring-loaded towards the sealing ring (3). Gas is pumped into spiral grooves (6) formed in the sealing face (5) of either the sealing ring (3) or the sealing element (1) and extending from an edge thereof during rotation of the sealing ring (3) and a gap (S) is created between the sealing element (1) and the sealing ring (3) against the force of the spring. Each groove is divided into two channels by a wedge-shaped partition (7) extending from the end wall of the groove (6). During speed changes of the rotating sealing ring (3), the gap (S) is maintained by high pressure at the closed end of the channels. The partition (7) is designed to offer little resistance to gas flow in the channel.

13 Claims, 4 Drawing Sheets

SHAFT SEAL

The invention relates to a non-contacting shaft seal for rotating shafts which can be used in turbo-machines.

Non-contacting shaft seals provide advantages over seals where the sealing surfaces contact one another due to reduction in wear and the lower heat generation. Article entitled "Fundamentals of Spiral Groove Non-contacting Face Seals" by Gabriel, Ralph P. (Journal of American Society of Lubrication Engineers Volume 35, 7, pages 367–375, and "improved Performance of Film-Riding Gas Seals Through Enhancement of Hydrodynamic Effects" by Sedy, Joseph (Transactions of the American Society of Lubrication Engineers, Volume 23, 1 pages 35–44) describe non-contacting seal technology and design criteria and are incorporated herein by reference.

U.S. Pat. No. 4,212,475 describes a shaft seal of turbo-machine comprising the spiral-loaded sealing element and the rotary sealing ring, one end face of which is provided with the sealing face and plurality of the spiral grooves. The grooves are formed by two lateral arcs connected by the third one of the circle which is the boundary between the grooves and the sealing face forming four peaks: two peaks on the boundary with the sealing face and two peaks on the inlet end faces of the rotary ring or circular element which may be made on the outside or inside edge of one of the mentioned rings. In this case, the width of the sealing band (dam) and the width of entire end face of the ring are determined according to the formula:

$$\frac{GD - ID}{OD - ID} = 0.5 - 0.8,$$

if the groove is made from the outside edge of the rotary ring or the circular element
and $$\frac{OD - GD}{OD - ID} = 0.5 - 0.8,$$

if the groove is made from the inside edge of one of the rings,
where:
  OD is the outside diameter;
  ID is the inside diameter;
  GD is the diameter of a circle, defined by the boundary of the grooves and the sealing face.

The formation of the grooves is caused by the necessity to prevent wearing of the end faces of the element and the ring which occurs due to friction against each other. Upon ring rotation, gas transferred from the chamber is trapped into the grooves and is forced to move towards the centre. During rotation, gas inside the grooves is compressed, its pressure is increased and the force is created affecting the element and promoting the creation of the gap between the end faces of the circular element and the ring. This force and gap are approximately constant under condition when the compressor mode of operation is constant and specified speed of the shaft rotation and gap pressure in the chamber are ensured. Upon transient conditions when, e.g. speed of rotation is reduced and gas pressure inside the chamber remains high, the balance of forces affecting the ring and the element outside and inside the gap is disturbed. At this time we can observe distortion, friction of the end faces of the ring, and the element against each other, their wear and failure. Changes in the mode of operation result in increased vibration of the rotor, angular oscillations of the rotary sealing ring which lead to wear of the sealing end faces and failure of the seal. Thereby, the disadvantage of the said seal of the shaft lies in its low reliability when running at transient conditions because of instability of the gap between the sealing end faces the ring and the element (instability of the working medium layer in the gap).

Russian Inventors Certificate 1,535,122 describes a shaft seal of a spring-loaded circular sealing element and the rotary sealing ring, one end face of the sealing ring is provided with a sealing face having a plurality of the spiral grooves provided therein each with a dividing partition. Therein, the dividing partition in each spiral groove is made in the shape of the substantially rectangular bulge. The bulge divides each groove into two cavities terminating in obtuse peaks. The dividing partition is made integral with sealing face and flush with the end face of the ring. The said partitions are intended to improve the gas flow in the grooves compared to grooves with circular peaks and, therefore, for stabilisation of radial layer of working medium inside the end gap. However, shaft seals with partitions of this nature, provide an unstable layer of the gas layer during transient conditions such as start-up, shut-down or speed variation of the motor. This leads to disturbance of stabilisation of radial layer of working medium at the end gap during transient conditions (e.g. start-up and shut-down) and this results in the distortion and vibration of the ring and the element and, therefore, in local abrasion of the end faces of the element and the seal failure.

EP-A-0 595 437 discloses a non-contacting gas seal with a triangular groove pattern. The groove pattern allows bidirectional operation of the seal.

The present invention seeks to provide a stable radial layer of the working medium at the end gap under different modes of operation including transient conditions to provide the work of turbo-machine by means of improving the shape of the groove. The working medium will normally be a gas.

According to the present invention, there is provided the shaft seal described in claim 1. Preferably, the partitions are shaped so as to form only acute angled faces to the gas flow, thereby only causing slight disruption to the gas flow.

The present invention provides a partition which allows smooth gas flow around the partition and/or in the channels. A marked improvement in the stability of the gas layer, especially during transient conditions, is thus provided compared to the rectangular-like partitions of the prior art. The present inventors speculatively consider that the partitions of the prior art acted as obstacles to the gas flow in the grooves due to the blunt face provided by the partition. Consequently, the partition caused turbulence in the gas flow and acted to resist gas flow thereby reducing the stability of the gas layer, especially during transient conditions.

The partition may take any suitable form but preferably the separating partition is made in the shape of the wedge for example, formed by intersection of arcs connecting pairs the opposite peaks.

According to preferred embodiments of the invention, the seal will have the following characteristics. The sealing ring has an outside diameter (DH) and an inner diameter (DO). In the case where the spiral grooves extend from the outside edge of the sealing ring, the circumference of diameter (DK) upon which peaks of wedge partitions are placed and circumference of diameter (DB) which is the boundary between grooves and the sealing face is defined according to the formula:

$$\frac{DK - DB}{DH - DB} = 0.2 - 0.8,$$

The width of sealing face and the whole end face surface of the sealing ring is defined according to the formula:

$$\frac{DB - DO}{DH - DO} = 0.3 - 0.5,$$

when the grooves extend from the outside the edge of the sealing ring, and $$\frac{DB - DK}{DB - DO} = 0.2 - 0.8,$$

and the width of the sealing face and the whole end face of the sealing ring:

$$\frac{DH - DB}{DH - DO} = 0.3 - 0.5,$$

in case grooves are made from the inside edge of the ring element,
where:
DH is the sealing ring outside edge diameter;
DK is the diameter of the circle upon which peaks of wedges partitions of grooves;
DB is the diameter of the circumference which is the boundary between grooves and the sealing face;
DO is the sealing ring inside diameter.
In addition arcs forming side edges of grooves can be formed by radius R. R is equal to the half of sealing ring outside diameter (DH) in case grooves are made from the outside diameter. R is equal to the half of inside diameter (DO) in case grooves are made from the inner edge of the ring. R is measured from a point on a circumference the diameter of which is connected with outside diameter (DH) by means of the following relationship:

$$\frac{D}{DH} = 0.25 - 0.4,$$

where D is the diameter of circumference upon which the radius centre of grooves side edges arcs are placed.

In addition, or alternatively, the outside diameter of the face of the sealing element opposed to the spiral grooves in the sealing ring may have radial guide slots. The guide slots are formed at an acute angle with the opposed end face with the aim of reduction of pressure entrance losses of gas entering into the spiral grooves.

The radial guide slots on the outside ungrooved end face of either the element or sealing, at an acute angle with the plane of the end face, provide the reduction of entrance losses of pressure, decrease of temperature and reduced power losses. These slots promote elimination of flow vortex at an entrance into the end gap and increase of gas flow stability in the sealing gap S and, therefore, maintaining constant sealing gap S.

The range of the sealing gap S between the circular element and the rotary ring is maintained by equality of gas and static forces affecting the sealing end in the gap S, as well the forces affecting the outside faces of the sealing circular element and the rotary ring, spring efforts (or other biassing means) and gas and dynamic balancing forces, resulting from an influence of the spiral grooves on the working medium. Of course, the gap S can be varied depending upon the particular installation with consequential alteration of the width of the sealing face and/or the length of the grooves.

During transient conditions caused by changing the working mode of the compressor, e.g. during start-up or shut-down, the acute angles formed by the partition on the inside diameter of the groove provide areas of high pressure maintaining the working gap S. Adjustment of the stiffness of gas film i.e. depending on the mode of operation gas, can be controlled by varying the angle of the partition in the groove. Thereby, a predetermined base pressure can be created which provides a force which keeps constant the size of the sealing gap S against the biasing of the element. This controls damping of vibration and distortion by keeping balance of forces during changing the mode of operation. This results in the end faces remaining substantially parallel and so reducing their wear.

The wedge-shaped dividing partition forming an acute angle directed to inside of the groove to meet entering gas provides improvement of aerodynamics of the working medium movement to one or another angle of the groove.

The relationship of diameters, $$\frac{DK - DB}{DH - DB} = 0.2 - 0.8$$

and $$\frac{DB - BK}{DB - DO} = 0.2 - 0.8,$$

provides, in the described installation, optimal gas flow within the groove.

The relationship $$\frac{DB - DO}{DH - DO} = 0.3 - 0.5$$

and $$\frac{DH - DB}{DH - DO} = 0.3 - 0.5,$$

provides the correct sizing of the spiral grooves to allow force needed for creation of optimal gap S between end face sealing surfaces of the rotary ring and sealing element,
When:
DH is the outside diameter of the sealing ring;
DK is the diameter of the circumference upon which wedges peaks (partitions) of grooves are placed;
DB is the diameter of the circumference which is the boundary between grooves and the sealing face;
DO is the inside diameter of the ring.
To further improve the aerodynamics in the grooves the arcs forming side edges of grooves have a radius R. R is equal to either the half of the ring outside diameter (DH) in case grooves are made from the outer edge of the ring, or to half of inside diameter (DO) of the ring in case grooves are made from the inner edge of the ring. The arcs centre upon a circumference of a diameter which relates to the outside diameter of the ring by the following relationship:

$$\frac{D}{DH} = 0.25 - 0.4,$$

where:

D is the diameter upon which radius R centre of grooves side edges arcs are placed.

In the above-described embodiments, the relationships can be determined experimentally. In the described embodiments, the defined ranges give the largest improvement on the stability of the seal.

Thereby, a shaft seal is provided with a stable layer of the working medium inside the end at different modes of operation of turbo-machine including transient conditions, by means described above.

Rather than the spiral grooves being formed in the rotating sealing ring, the grooves may be formed in the non-rotating sealing element. This may require altering the dimensions of the grooves to provide the gap S, due to the reduced fluid flow into the grooves.

The small volumes associated with the terminating end of each channel, into which the fluid is pumped during transient conditions, provide high pressure areas which maintain the distance (S) between the rotating sealing ring and the non-rotating seal element.

The shape of the groove and partition walls are designed to cause fluid flow to allow the necessary pressure maintenance.

Preferred embodiment of the present invention will now be described with reference to the following drawings in which.

Figure 1:
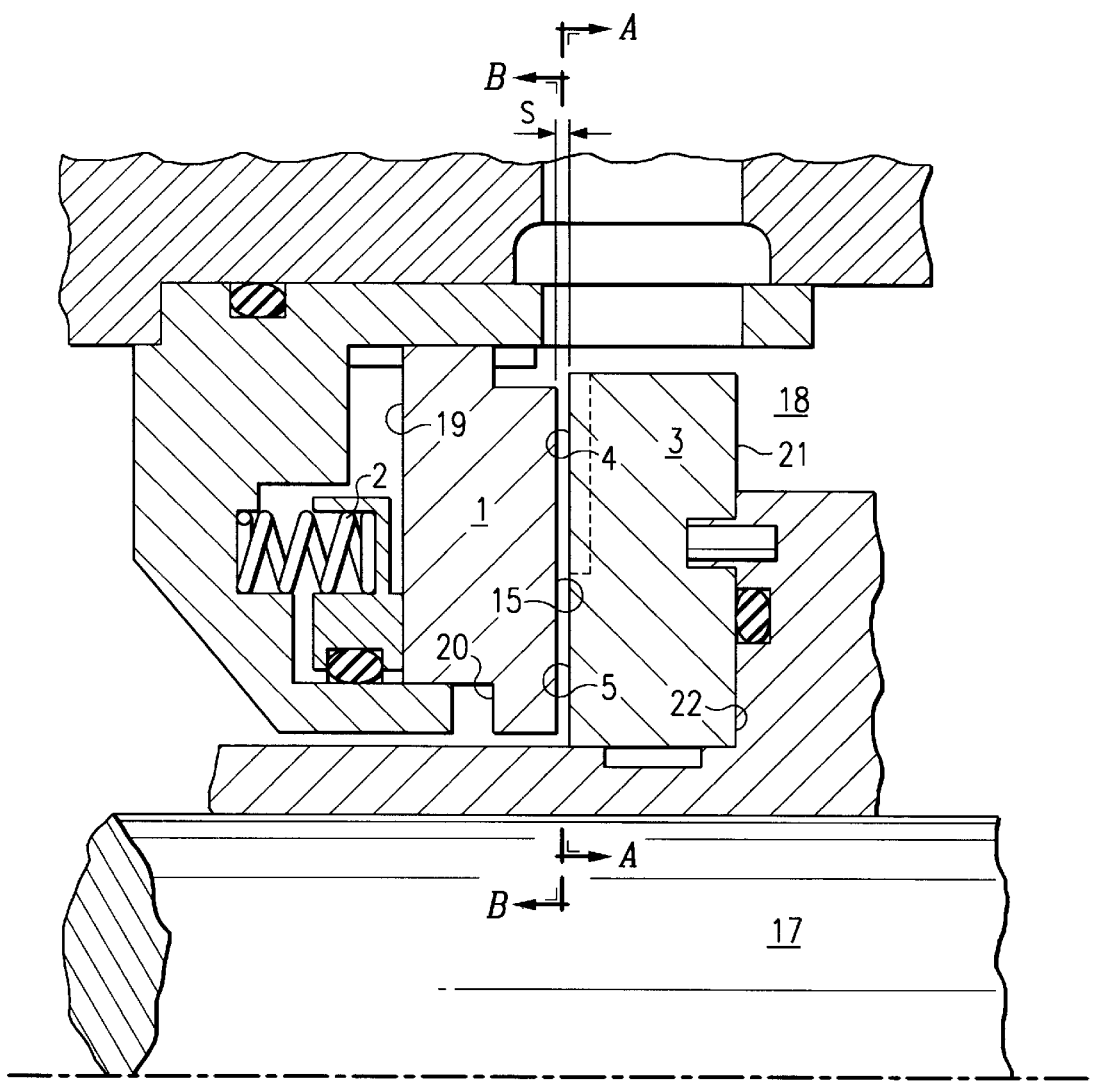
FIG. 1 is a view in longitudinal section of the seal.

The invention provides the shaft seal comprising the circular sealing element 1 with the pressing spring 2 the rotary ring 3. The end face 4 of the ring 3 is provided with the sealing face 5 and a plurality of the spiral grooves 6 extending from its inner or outer periphery along a helix angle. Hereby, the grooves 6 have the dividing partition integrally made with the sealing face 5 and flush with the end face 4. The partition 7 is made in the shape of the wedge 7 formed by intersecting of the additional arcs 8 and 9 connecting in pair the opposite peaks 10 and 11, 12 and 13 placed an the entrance end S of the grooves and the circle diameter which is the boundary of the grooves 6 and the sealing face 5 forming two acute angles in the peaks 10 and 13 on the boundary between the grooves 6 and the sealing face 5 as well as an acute angle 14 inwardly the grooves 6.

Figure 2:
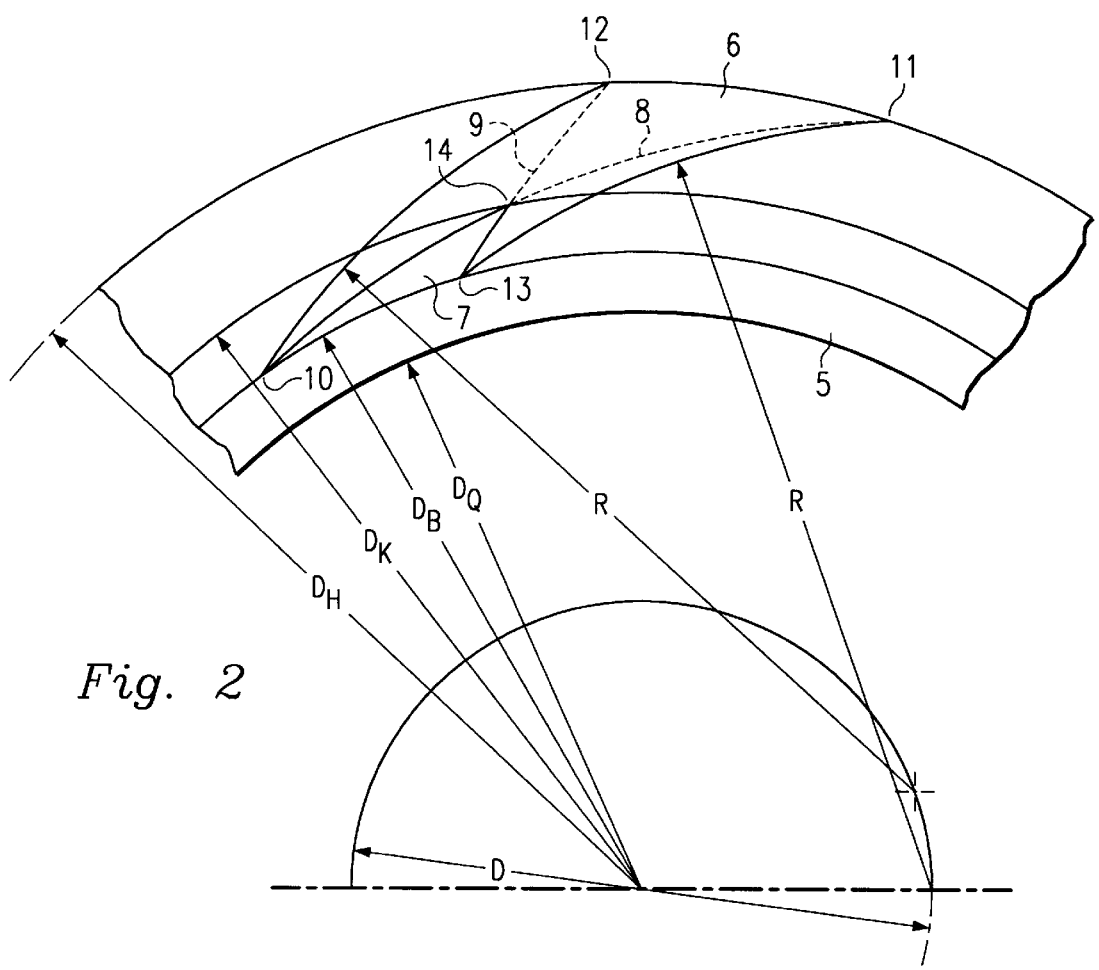
FIG. 2 is a sectional view A—A of FIG. 1 with the grooves made on the outer diameter of the ring.
Figure 3:
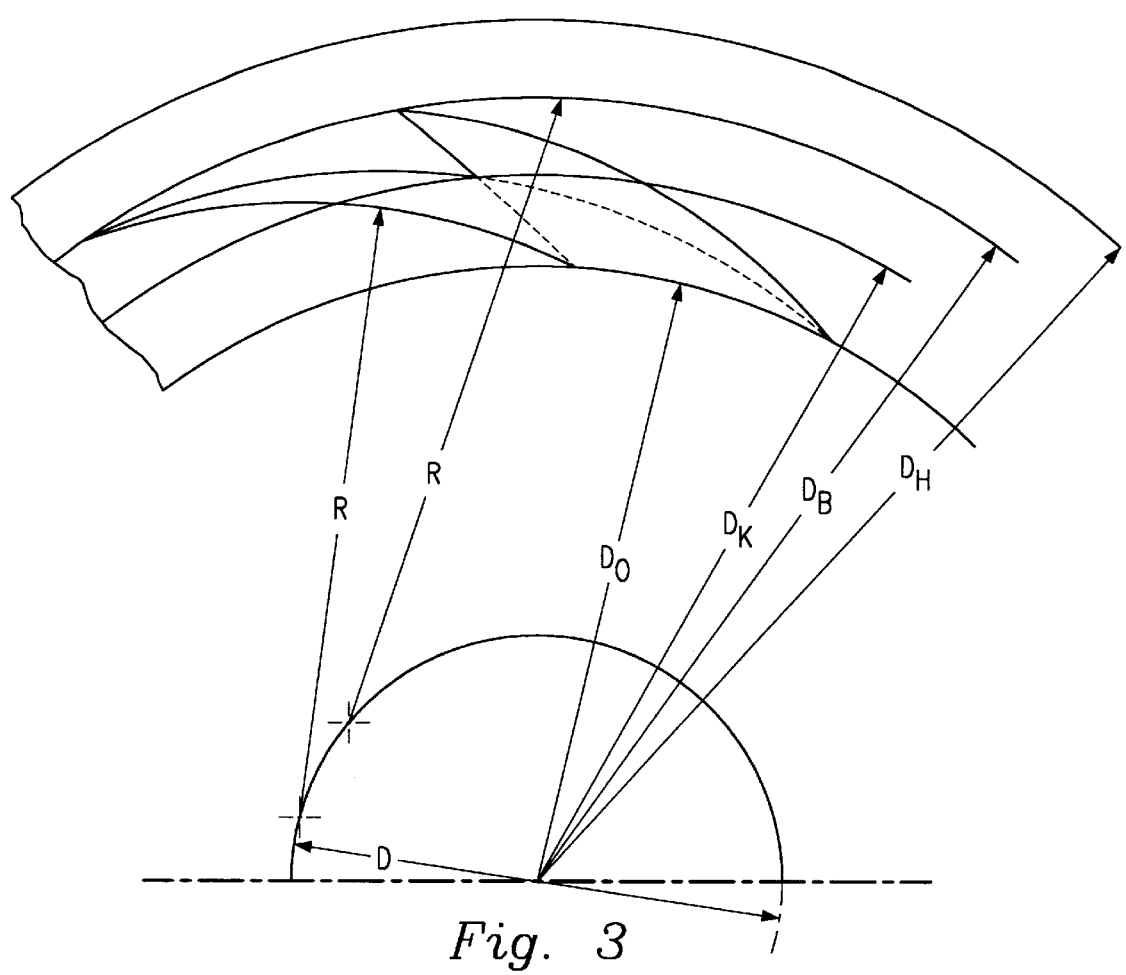
FIG. 3 is a sectional view A—A of FIG. 1 with the grooves made on inside diameter of the ring.
Figure 4:
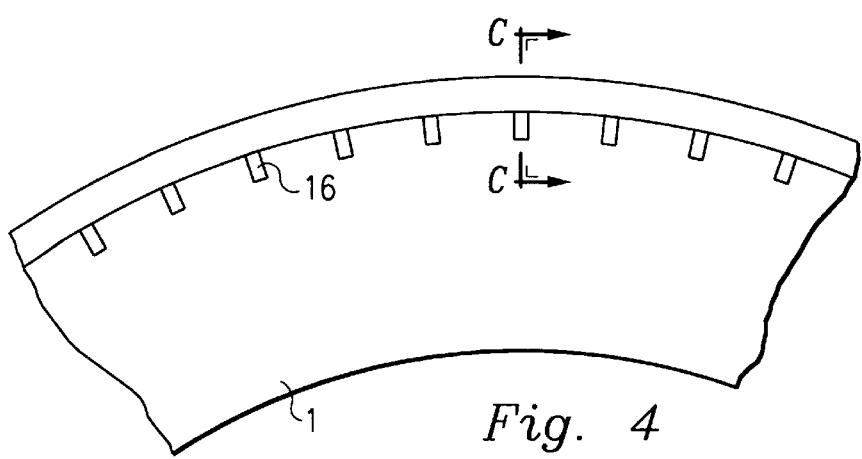
FIG. 4 is a sectional view B—B of FIG. 1.
Figure 6:
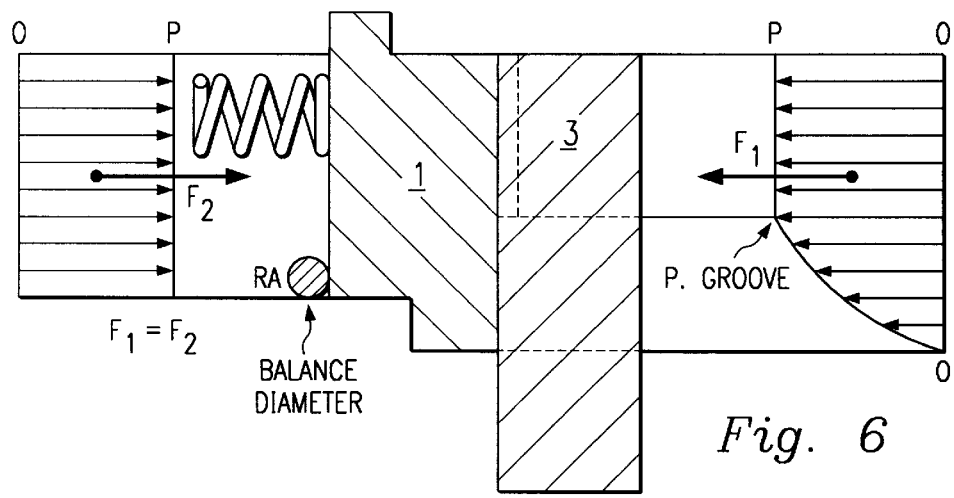
FIG. 6 is a schematic pressure distribution map of the forces working on the seal.
Figure 5:
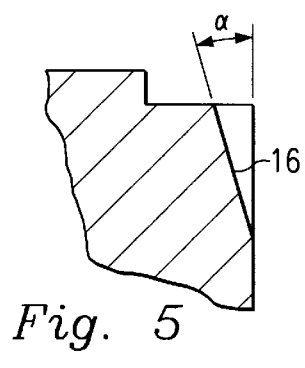
FIG. 5 is sectional view C—C of FIG. 4.
Figure 7:
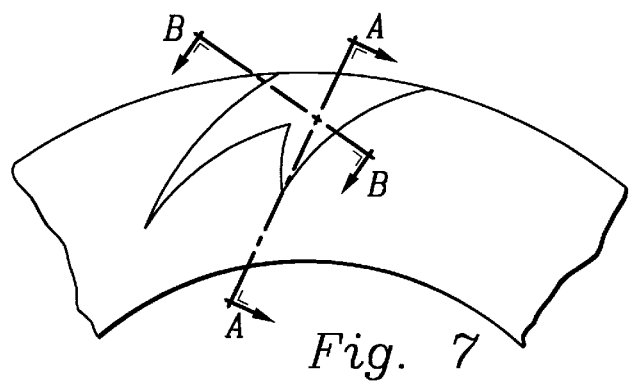
FIG. 7 is an enlarged view of a part of the sealing ring of FIG. 2.
Figure 8:
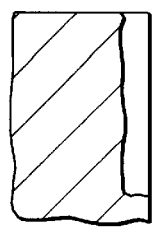
FIG. 8 is a view along the line A—A of FIG. 7 (not to scale.
Figure 9:
FIG. 9 is a view along the line B—B of FIG. 7 (not to scale.

The grooves may be made both from the side of the outer diameter DH of the ring 3 and from the side of its inside diameter DO. Shallow grooves 6 (see FIG. 2) are formed in the surface of the seal ring 3 which faces the seal element 1. The bottoms of the grooves in cross-sectional width are flat (see FIGS. 7, 8 and 9 showing cross-sectional views A—A and B—B) and extend along a helix angle radially inward from one end opening to the outer periphery of the ring to inward pointed tips at 10 and 13 (refer again to FIG. 2). The tips 10, 13 are spaced radially outward from the inner periphery of the ring leaving a radial section 5 of the ring surface (the dam area) which is not grooved. The direction of spiral of the grooves, in this case, is counter to the direction of rotation of the shaft.

The outer DH diameter of the rotary ring 3, the diameter DK of the circumference, on which the peaks of the wedges (partitions) 7 are set, the diameter DB of the circumference which is the boundary between the grooves 6 and the sealing face 5, and the inner diameter DO of the sealing ring 3, are related according to the formula:

$$\frac{DK - DB}{DH - DB} = 0.2 - 0.8, \quad (i)$$

if the grooves 6 are made from the outer edge of the sealing ring, or $$\frac{DB - DK}{DB - DO} = 0.2 - 0.8, \quad (ii)$$

if the grooves 6 are made from the inner edge of the sealing ring.

The width of the sealing face 5 and the width of the entire end face of the ring 3 provided with spiral grooves 6 are related according to the formula:

$$\frac{DB - DO}{DH - DO} = 0.3 - 0.5, \quad (i)$$

if the grooves 6 are made from the end of the outer edge of the outer diameter of the ring, and $$\frac{DH - DB}{DH - DO} = 0.3 - 0.5, \quad (ii)$$

if the grooves 6 extend from the inner edge of the ring 3.

where:

DH is the outer diameter of the ring 3 or the element 1 provided with the grooves 6;

DK is the diameter of the circumference on which the peaks of the wedges (partitions) 7 and the grooves 6 are set;

DB is the diameter of the circumference which is the boundary of the grooves 6 and the sealing face 5;

DO is the inside diameter of the ring 3 or the element 1.

If the grooves 6 are from the outer edge of the sealing face, the lateral arcs connecting the peaks 10, 12 and 13, 11 of the grooves 6 set from the end of the outer diameter of the ring 3, may be formed by the radius R which is equal to half a magnitude of the outer diameter DH of the ring 3.

If the grooves extend from the inner edge of the sealing face, the lateral arcs may be formed by the radius R which is equal to half a magnitude of the inside diameter of the ring 3.

In both cases of the circumference centre of the radius R of the arcs is set on the diameter which is determined according to the formula:

$$\frac{D}{DH} = 0.25 - 0.4,$$

where:

D is the diameter of the circumference on which the radius R centre of the arcs of the grooves lateral edges is set.

In addition, or alternatively, the outer diameter of the end face 15 i.e. at the end face of the ring sealing element 1, free (in this case) of spiral grooves 6 has the radial guide slots 16 made at an acute angle with the end face 15. The ring sealing element 1 and the rotary ring 3 are placed in the chamber 18 of the shaft 17 and have outer faces 19, 20, 21 and 22.

The working (sealing) gap S is formed between end faces of the ring 3 and circular element 1.

The invention provides the shaft seal operating as follows. Upon operation of the turbo-machine, the working medium, e.g. gas transferred, travels to the chamber 18 above the rotary ring 3 and the sealing element 1. When rotating the shaft 17, gas transferred travels through the guide slots 16 and the spiral grooves 6, wherein moving towards the centre and running against the sealing face 5, gas is compressed, its pressure is raised. When in operation, gas is pumped to a higher pressure flowing radially inward along the grooves to reach a maximum pressure at the tips 10, 13 of the grooves. The higher pressure forces against a spring 2 opening a small gap S (FIG. 1) between the two seals 1 and 3. Gas leakage through the gap is at a low design rate (see earlier referenced articles). When the shaft 17 is not rotating, the spring 2 urges the movable seal element 1 to close the gaps. In the present design, the seal is not bidirectional and seal separating pressures are not generated in both directions of shaft rotation. However, the same techniques could be applied to a bidirectional seal.

Accordingly, the shape of the grooves can be adapted to determine the size of the gap S, which is generally equal to some micrometers. The size of the sealing end gap S is maintained by equality of gas and static forces affecting the sealing end faces 4 and 15 and outer faces 19, 20, 21 and 22 of the element 1 and the ring 3 as well as a spiral 2 effort and gas and dynamic balancing force resulting from the effect of the spiral grooves 6 on the working medium.

In design of the seal, the pressure developed in the gap S is balanced against the pressure existing against the back side of the fixed seal element 1 (shown as the pressure curve to the left of the fixed seal element). The radial placement of the O-ring RA (commonly termed the secondary seal) determines the area of the back side which is exposed to system pressure. The diameter at which the secondary seal is placed is the "balance diameter" of the seal.

When changing the modes of operation, e.g. during start-up and shut-down, the defined pressure will be created inside the groove angles at peaks 10 and 13 in the working gap S, controlling stiffness of gas film in it. At high speed of rotation (at constant pressure differential on the seal and in the working gap S) gas to be compressed will travel along the wall which connects peaks 12 and 10 and will be compressed inside the angle at peak 10.

When operating under transient modes during start-up and shut-down of the compressor at maximum pressure, gas essentially travels along the wall connecting peaks 13 and 11 due to a low circumferential speed of the rotary ring 3, and is compressed in the angle of the peak 13.

Thereby, when changing the modes of operation, the sealing assembly will have wider range of steady operation without friction of the working faces at low revolutions of the shaft rotation compared to other shapes of the grooves.

Upon axially reciprocal deflection of the sealing element 1 and the rotary sealing ring 3, e.g. under axial vibration, the size of the sealing gap S will be changed. Increasing of the sealing gap results in increasing of the radial component of gas in the gap. Herein, gas will be compressed in the angle 13.

Reduction of the sealing gap S results in increase of the circumferential component of gas flow rate in the gap. Gas will be compressed in the angle at peak 10.

Thereby, the invention provides a shape of the spiral grooves 6 which considerably decreases axial vibration and causes its dampening. Herein, the working faces of the sealing gap are not contacted.

The shaft seal has a capacity for self-alignment when angular deflections of the sealing element 1 occur relative to the rotary ring 3. Upon appearance of the angular distortion (increased sealing radial gap S occurs at one side and decreased one appears at another side). As described above, the present seal provides balancing of the forces in the sealing gap S and thereby a decrease of the angular distortion, i.e. the angular stabilization of the sealing assembly.

As can be seen from the figures, in any one embodiment, the various circles and circumferences are concentric, and the centres lie on the axis of rotation of the rotary ring (3).

What is claimed is:

1. A shaft seal comprising a sealing element (1) biased towards an end face of a rotary sealing ring, the end face (4) of the sealing ring (3) or the sealing element (1) having a sealing face (5) with a plurality of spiral grooves (6) extending from an edge of the face (5) to a boundary extending around the sealing face (5), each groove (6) including a separating partition (7) extending from the boundary and separating the groove (6) into two channels, characterised in that the partition (7) comprises two partition walls which intersect each other with an acute angle formed therebetween so as to substantially minimise disruption of fluid flow in the groove and wherein the partition only has two partition walls, one partition wall extending from the intersection of one side wall of the groove (6) and the boundary, and the other partition wall extending from the intersection of the other side wall of the groove (6) and the boundary, wherein the partition (7) does not form a separating barrier between adjoining grooves (6).

2. The shaft seal according to claim 1, wherein the partition (7) is substantially wedge shaped.

3. The shaft seal according to claim 1, wherein the partition closes the groove within the sealing face (5) and said one partition wall and said one side wall intersect with an acute angle therebetween, and said other partition wall and said other side wall intersect with an acute angle therebetween.

4. The shaft seal according to claim 1, wherein the partition walls and/or the side walls are curved.

5. The shaft seal according to claim 1, wherein the separating partition comprises a wedge formed between the boundary, a first arc and second arc, the first arc extending from the point of intersection of said one partition wall and said one side wall to the end of the other side wall adjacent the edge of the sealing face (5), and the second arc extending from the point of intersection of said other partition wall and said other side wall to the end of said one side wall adjacent the edge of the sealing face (5).

6. A shaft seal comprising a sealing element (1) biased towards an end face of a rotary sealing ring (3), the end face (4) of the sealing ring (3) or the sealing element (1) having a sealing face (5) with a plurality of spiral grooves (6)

extending from an edge of the face (5) to a boundary extending around the sealing face (5), each groove (6) including a separating partition (7) extending from the boundary and separating the groove (6) into two channels characterised in that the partition (7) comprises two partition walls which intersect each other with an acute angle formed therebetween so as to substantially minimise disruption of fluid flow in the groove and wherein the partition only has two partition walls, one partition wall extending from the intersection of one side wall of the groove (6) and the boundary, and the other partition wall extending from the intersection of the other side wall of the groove (6) and the boundary, and wherein the outer edge of the sealing ring (3) is circular of diameter DH, the inner edge of the sealing ring (3) is circular of diameter DO, in each groove the intersection of the partition walls falls on a circumference of diameter DK and in each groove the intersection of the partition walls and the side walls falls on a circumference of diameter DB, which are related according to either the formula $$0.2 \leq \frac{DK - DB}{DH - DB} \geq 0.8, \quad (i)$$

in case grooves (6) are made from the outer edge of the sealing face (5); or the formula $$0.2 \leq \frac{DB - DK}{DB - DO} \geq 0.8, \quad (ii)$$

in case grooves (6) are made from the edge of the inner diameter of the rotary ring (3) or annular element (1).

7. The shaft seal according to claim 6, wherein the width of the sealing face (5) and the width of the whole end face (4) of the ring (3) or element (1), is determined to either the formula $$0.3 \leq \frac{DB - DO}{DH - DO} \geq 0.5, \quad (iii)$$

in case grooves (6) are made from the end of the outer edge of the sealing face (5); or the formula $$0.3 \leq \frac{DH - DB}{DH - DO} \geq 0.5, \quad (iv)$$

if grooves are made from inner edge of the sealing face (5).

8. The shaft seal according to claim 6, wherein the partition (7) is substantially wedge shaped.

9. The shaft seal according to claim 6, wherein the partition closes the groove within the sealing face (5) and said one partition wall and said one side wall intersect with an acute angle therebetween, and said other partition wall and said other side wall intersect with an acute angle therebetween.

10. The shaft seal according to claim 6, wherein the partition walls and/or the side walls are curved.

11. The shaft seal according to claim 6, wherein the separating partition comprises a wedge formed between the boundary, a first arc and second arc, the first arc extending from the point of intersection of said one partition wall and said one side wall to the end of the other side wall adjacent the edge of the sealing face (5), and the second arc extending from the point of intersection of said other partition wall and said other side wall to the end of said one side wall adjacent the edge of the sealing face (5).

12. A shaft seal comprising a sealing element (1) biased towards an end face of a rotary sealing ring (3), the end face (4) of the sealing ring (3) or the sealing element (1) having a sealing face (5) with a plurality of spiral grooves (6) extending from an edge of the face (5) to a boundary extending around the sealing face (5), each groove (6) including a separating partition (7) extending from the boundary and separating the groove (6) into two channels, characterised in that the partition (7) comprises two partition walls which intersect each other with an acute angle formed therebetween so as to substantially minimise disruption of fluid flow in the groove and wherein the partition only has two partition walls, one partition wall extending from the intersection of one side wall of the groove (6) and the boundary, and the other partition wall extending from the intersection of the other side wall of the groove (6) and the boundary, and wherein each side walls of each groove (6) extend along an arc of radius R, where R is equal to either (a) half of the outer diameter (DH) the sealing face (5) when the groove (6) extends from the outer edge of the sealing face (5); or (b) half of the inner diameter of the sealing face (5) when the groove extends from the inner edge of the sealing face (5), and further wherein the centre of the arcs lies on a circle of diameter D related to the outside diameter DH of the sealing face according to the formula:

$$0.25 \leq \frac{D}{DH} \geq 0.4.$$

13. A shaft seal comprising a sealing element (1) biased towards an end face of a rotary sealing ring (3), the end face (4) of the sealing ring (3) or the sealing element (1) having a sealing face (5) with a plurality of spiral grooves (6) extending from an edge of the face (5) to a boundary extending around the sealing face (5), each groove (6) including a separating partition (7) extending from the boundary and separating the groove (6) into two channels, characterised in that the partition (7) comprises two partition walls which intersect each other with an acute angle formed therebetween so as to substantially minimise disruption of fluid flow in the groove and wherein the partition only has two partition walls, one partition wall extending from the intersection of one side wall of the groove (6) and the boundary, and the other partition wall extending from the intersection of the other side wall of the groove (6) and the boundary, and wherein the sealing face of either the sealing element (1) or the sealing face (3) free from spiral grooves (6) includes radial guide slots (16), the lower wall of each radial guide slot (16) extends from the inner or outer edge of the sealing face at an acute angle to the plane of the sealing face.

* * * * *